J. T. WHITE.
COAT HOOK.
APPLICATION FILED MAR. 28, 1914.
1,132,414.
Patented Mar. 16, 1915.
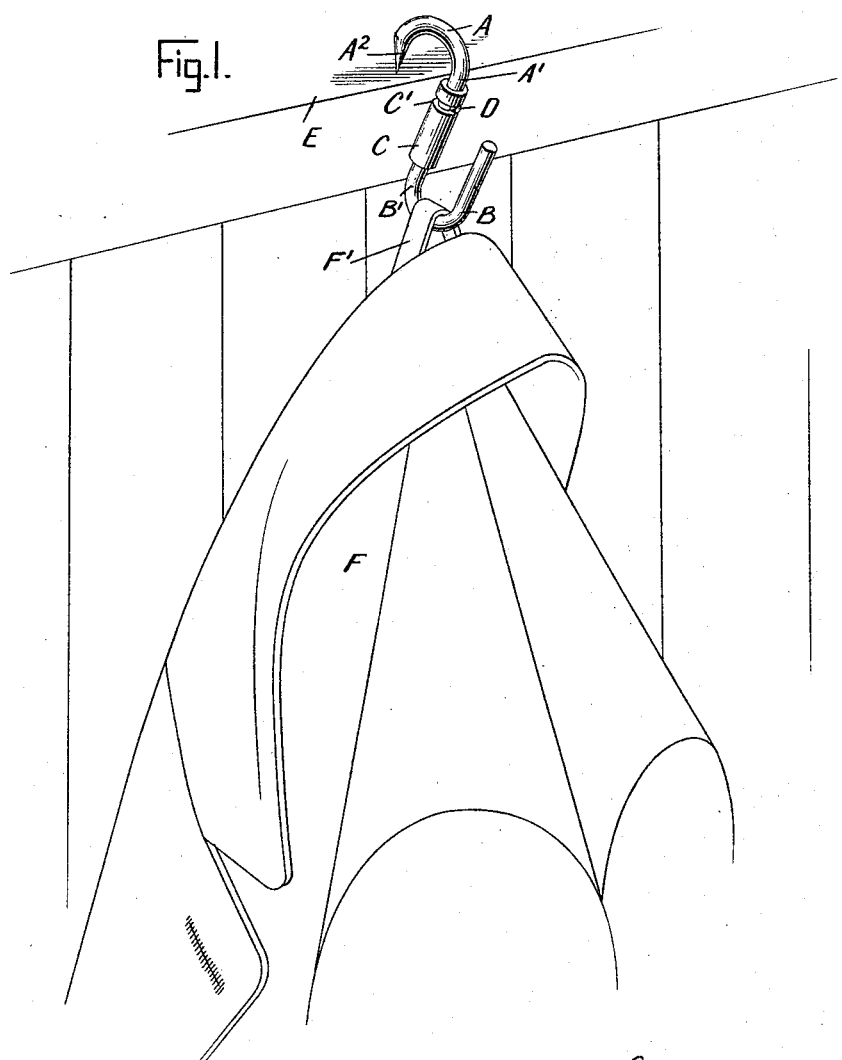
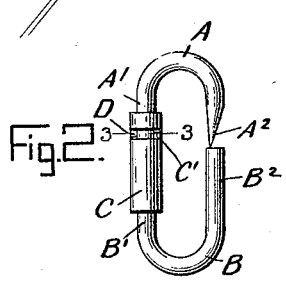
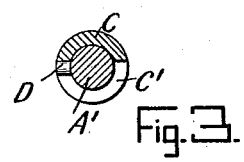
WITNESSES
INVENTOR
JOHN T. WHITE
BY
ATTORNEYS

UNITED STATES PATENT OFFICE.

JOHN TOMAS WHITE, OF NEW YORK, N. Y.

COAT-HOOK.

1,132,414.  Specification of Letters Patent.  Patented Mar. 16, 1915.

Application filed March 28, 1914. Serial No. 827,850.

*To all whom it may concern:*

Be it known that I, JOHN T. WHITE, a citizen of the United States, and a resident of the city of New York, borough of Manhattan, in the county and State of New York, have invented a new and Improved Coat-Hook, of which the following is a full, clear, and exact description.

The object of the invention is to provide a new and improved portable coat hook adapted to be readily extended and attached to a suitable support for supporting a coat or other garment and adapted to be folded into a safety position, to take up very little room with a view to allow of conveniently carrying the coat hook in a pocket.

In order to accomplish the desired result use is made of a hook made in sections, one movable on the other, to allow of extending the hook into S shape, the upper section terminating in a sharp point for attachment to a support and the lower section forming a support for a coat or other garment, the said section in folded position having the point protected by the lower section to allow of safely carrying the coat hook in a pocket.

A practical embodiment of the invention is represented in the accompanying drawings forming a part of this specification, in which similar characters of reference indicate corresponding parts in all the views.

Figure 1 is a perspective view of the coat hook with the sections extended and applied; Fig. 2 is a side elevation of the same with the sections in folded position; and Fig. 3 is an enlarged sectional plan view of the same on the line 3—3 of Fig. 2.

The coat hook consists essentially of an upper hook section A and a lower hook section B, the shank B' of which is provided with a tubular bearing C in which is mounted to turn the shank A' of the upper hook section A. The shank A' is provided with a pin D extending in a slot C' formed in the bearing C so as to limit the turning motion of the shank A' in the bearing C. The slot C' is so arranged that the hook sections A and B can turn one relatively to the other within an angle of 180°. In the extended position shown in Fig. 1, the hooks A and B are in position for use and permit of the pointed end $A^2$ of the hook section A to engage a suitable support E, such as a molding or other projection, while the hook section B is adapted to receive the coat hanger F' of a coat or other garment F to be supported. When the coat hook is not in use the hook sections A and B are turned one relatively to the other until the point $A^2$ of the hook section A which is beveled as shown is directly over the top of the free member $B^2$ of the hook section B, whereby the point $A^2$ is protected and is not liable to tear the lining of the coat, and the coat hook in this folded position can be readily carried.

The coat hook is very small and requires no nails, screws or other fastening devices for attaching it to a suitable support, and the coat hook can be readily carried on a key ring or can be used as a key ring if desired. The coat hook can be used conveniently in such places as theaters, churches, stores, factories, trains, etc., as well as at home, and by the arrangement described the point $A^2$ will readily hold fast to the smallest margin of projecting woodwork. It will be noted that this device is extremely simple and easy to handle as it can be manipulated with one hand to open or close while the other is left free to handle the coat or other article.

Having thus described my invention, I claim as new and desire to secure by Letters Patent:

1. A coat hook comprising an upper and a lower hook section, the shank of the lower section provided with an enlarged tubular rigid socket at its upper end and a horizontal slot extending through one side of the socket adjacent the upper end thereof, the shank of the upper section axially fitted within said socket and having a lug or pin projecting outwardly and engaging said slot, the upper hook section having a bevel pointed end and the lower hook section having a flat hook end.

2. A coat hook comprising an upper and a lower hook section the shank of the lower provided with an enlarged tubular rigid socket at its upper end and having a horizontal slot extending through one side thereof and slightly beyond its center said slot being positioned adjacent the upper end of the socket, the shank of the upper section extending into said socket and beyond the slot therein and having a lug projecting radially into said slot the outer face of the lug being flush with the outer surface of the socket, the upper hook section having a bevel pointed end and the lower hook section having a flat top hook end.

In testimony whereof I have signed my name to this specification in the presence of two subscribing witnesses.

JOHN TOMAS WHITE.

Witnesses:
THEO. G. HOSTER,
PHILIP D. ROLLHAUS.

Copies of this patent may be obtained for five cents each, by addressing the " Commissioner of Patents, Washington, D. C."